UNITED STATES PATENT OFFICE 1,948,178

VAT DYESTUFFS OF THE DIPYRAZOL-ANTHRONYL SERIES

Max Albert Kunz, Mannheim, and Karl Koeberle, Ludwigshafen - on - the - Rhine, Germany, assignors to General Aniline Works, Inc., New York, N. Y., a corporation of Delaware No Drawing. Application August 1, 1930, Serial No. 472,486, and in Germany August 12, 1929

2 Claims. (Cl. 260—45)

The present invention relates to new vat dyestuffs of the dipyrazolanthronyl series and process of producing same.

We have found that new valuable vat dyestuffs are obtained by condensing dipyrazolanthronyl, its derivatives or homologues, containing a negative substituent with compounds to which a reactive hydrogen or metal atom is attached by means of nitrogen, oxygen or sulphur. As negatively substituted dipyrazolanthronyls, preferably such as contain from 1 to 4 halogen atoms, nitro or sulphonic acid groups may be employed. Suitable reacting components containing a hydrogen or metal atom attached to nitrogen, oxygen or sulphur are for example amines, imines, acid amides or imides, hydroxy and mercapto compounds, or compounds of the said kind containing a metal atom instead of the reactive hydrogen atom. When dipyrazolanthronyls containing several negative substituents are employed as initial material only one of the negative substituents or several thereof may be replaced, but in the latter case the negative substituents should be replaced by the same radicle.

The condensation is preferably carried out in organic dissolving or suspending media, for example in nitrobenzene, naphthalene and the like, and in the presence of acid-binding agents, such as for example the oxides of alkali or alkaline earth metals, or alkaline salts thereof, or organic bases, for example dimethylaniline. Condensing catalysts, such as metals or metal compounds are preferably added to the reaction mixture.

The imines produced in the aforesaid manner may be subjected, in the same reaction mixture in which the condensation is carried out, if desired, to alkylation, acylation, or carbazolization by means of acid or alkaline condensing agents, or to saponification or to further condensation to higher molecular compounds in cases in which the radicles introduced are capable to undergo such further condensation, for example when benzanthrone radicles have been introduced which may be further condensed to dibenzanthrone radicles.

The products obtainable in the aforesaid manner correspond to the formula:

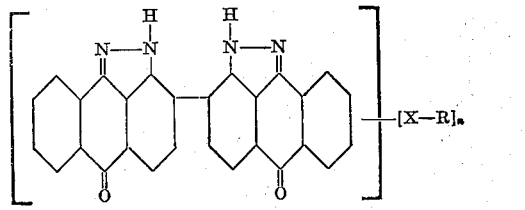

in which X stands for —N.H—, —O— or —S—, R for hydrogen or an organic radicle, n for a number between 1 and 4, and in which the hydrogen atoms attached to nitrogen atoms may be wholly or partly replaced by alkyl radicles.

Products of the same structure may also be obtained by condensing pyrazolanthrones containing a negative substituent and having a free 2-position with compounds containing a reactive hydrogen or metal atom attached by means of nitrogen, oxygen or sulphur, and then subjecting the condensation products thus obtained to further condensation to form the corresponding dipyrazolanthronyl derivatives.

The products are obtained in the before described manner in very good yields and often in crystalline form. They dye the vegetable fibre most various shades. If necessary the dyestuffs may be purified according to known methods, for example by crystallization from organic solvents or sulphuric acid, or by treatment with oxidizing agents, for example by treating their aqueous paste with an alkali metal hypochlorite. Leuco compounds, such as leuco esters, may be prepared from the dyestuffs according to known methods.

The nature of the present invention will be further illustrated by the following examples, but the invention is not restricted thereto. The parts are by weight.

Example 1

30 parts of dibromo-N.N'-diethyl-dipyrazolanthronyl (obtainable by brominating N. N'-diethyl-dipyrazolanthronyl in chlorosulphonic acid at between 80° to 85° C.) are heated to boiling, while stirring, in 500 parts of naphthalene with 30 parts of sodium acetate, 7 parts of copper oxide and 23 parts of 1-amino-anthraquinone until the reaction product is practically free from bromine. The reaction mixture is then allowed to cool, diluted with monochlorobenzene, and the product filtered off, or the solvent is distilled off, if desired under reduced pressure, or expelled by means of steam. The reaction product obtained in a very good yield in the form of a violet crystalline powder, dissolves in concentrated sulphuric acid to give a yellow brown solution and dyes cotton from a blue green vat violet shades of very good fastness, in particular against boiling with a soda solution. The dyestuff obtained probably corresponds to the formula

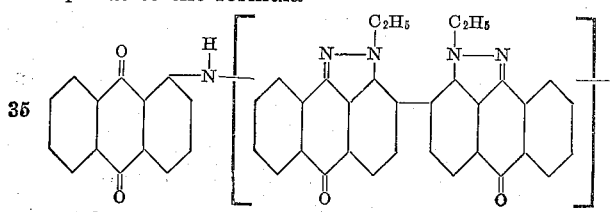

The product obtained in an analogous manner with 1-amino-anthraquinone-2-aldehyde dyes Bordeaux red shades.

By condensing the aforedescribed dibromo derivative with 2 molecular proportions of 6-aminodibenzanthrone a blue black condensation product is obtained dyeing the vegetable fibre from a blue vat violet blue to blue black shades according to the strength of the dyebath.

Aminobenzoylaminoanthraquinones or polyaminoanthraquinones or amino compounds of cyclic compounds having a high molecular weight, for example aminoanthraquinoneacridones, aminoanthrimides, aminoanthrimide carbazoles, aminobenzanthrone-pyrazolanthrones or amino derivatives of compounds containing the perylene or pyrene ring system may be used for the condensation instead of the 1-aminoanthraquinone.

The dibromo derivative may be replaced by an equivalent amount of dichloro derivative.

Example 2

62 parts of the dibromo derivative employed in Example 1 are boiled, while stirring, in 1000 parts of nitrobenzene with 50 parts of sodium acetate, 10 parts of copper oxide and 50 parts of benzamide until the formation of the dyestuff is complete. The reaction mixture is then worked up as described in Example 1. The condensation product obtained is a violet red powder, dissolves in concentrated sulphuric acid to give an orange solution and dyes cotton from a blue green vat blue red shades of very good fastness. The dyestuff obtained probably corresponds to the formula

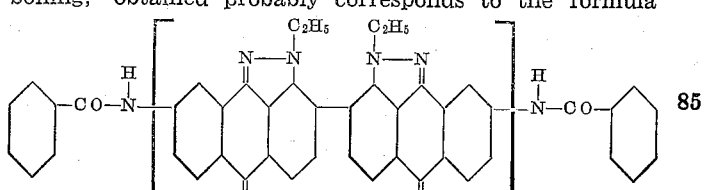

The condensation products obtained in an analogous manner with potassium phthalimide or para-toluene sulphonic acid amide dye cotton, after precipitation from their solution in concentrated sulphuric acid, Bordeaux red shades as does also the condensation product obtained with ammonia, whereas the condensation products obtained with aniline or toluidine dye faint red violet shades.

Example 3

62 parts of a chlorobromo-N.N'-diethyl-dipyrazolanthronyl (obtainable by brominating N.N'-diethyl-dipyrazolanthronyl in chlorosulphonic acid at between 90° and 100° C. in the presence of iodine) are boiled, while stirring, in 1000 parts of naphthalene with 50 parts of potash, 10 parts of copper oxide and 50 parts of pyrazolanthrone until the product is free from bromine. The reaction mixture is then allowed to cool and the product filtered off after dilution with chlorobenzene. The condensation product obtained in a very good yield is a red powder, dissolves in concentrated sulphuric acid to give an orange solution and furnishes strong red shades on cotton from a blue green vat. The dyestuff obtained probably corresponds to the formula

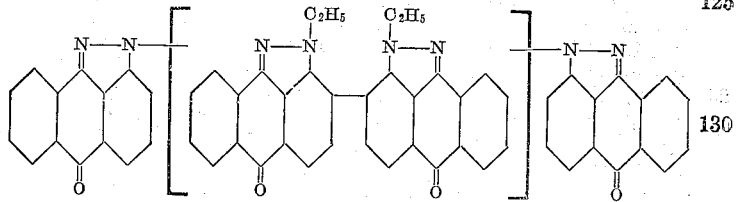

By melting the condensation product with alcoholic caustic potash a product is obtained dyeing strong yellow red shades. After methylating the condensation product it dyes pure red shades fast to alkali.

Condensation products dyeing blue red shades are obtained by condensing monobromo- or monochloro - N.N'-dialkyl-di-pyrazolanthronyls with 6-aminobenzanthrone, the said condensation products being converted into blue violet dyeing products by subsequent condensation by means of alkaline condensing agents.

Example 4

12.5 parts of the dibromo-N.N'-diethylpyrazolanthronyl employed in Example 1 are introduced into a solution prepared by heating to boiling for a short time, while stirring, 100 parts of phenol and 20 parts of potash and cooled to 100° C. The reaction mixture is then heated to boiling for a short time. When the condensation is complete, the reaction mixture is allowed to cool, diluted with alcohol and worked up as usual. The blue red powder obtained dissolves in concentrated sulphuric acid to give an orange solution and dyes cotton strong very fast Bordeaux red shades from a blue green vat. The dyestuff obtained probably corresponds to the formula

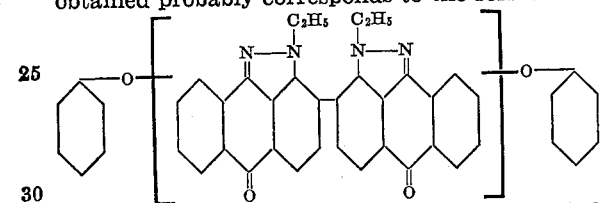

A reaction product dissolving in concentrated sulphuric acid to give a yellow brown solution and dyeing cotton strong red shades from a green vat is obtained in an analogous manner by condensation of monobromo - N.N' - dimethyl-dipyrazolanthronyl with anthraquinone-1-mercaptane, for example in nitrobenzene in the presence of copper oxide and sodium acetate.

*Example 5*

25.5 parts of 5-chloro-N-ethyl-1.9-pyrazolanthrone (obtainable by condensation of 1.5-dichloroanthraquinone with hydrazine hydrate and subsequent ethylation) are boiled, while stirring, in 150 parts of naphthalene with 25 parts of 1-amino-anthraquinone, 2 parts of copper bronze and 20 parts of potash until a sample, after working up, is practically free from chlorine. The reaction mixture is allowed to cool and worked up as usual. 25 parts of the reaction product thus obtained are introduced at between 130° and 140° C. into a mixture of 200 parts of caustic potash and 150 parts of ethyl alcohol, the reaction mixture being then kept at the same temperature for several hours. The melt is then taken up with hot water and the reaction product filtered off, if necessary after precipitating it completely by blowing air through the aqueous suspension. The reaction product dissolves in concentrated sulphuric acid to give an orange solution and dyes cotton gray shades from a blue green vat. The dyestuff obtained probably corresponds to the formula

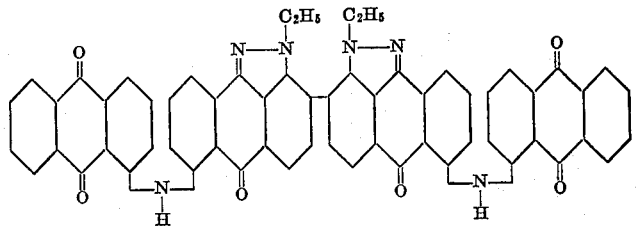

What we claim is:
1. The dipyrazolanthronyl derivatives corresponding to the formula:

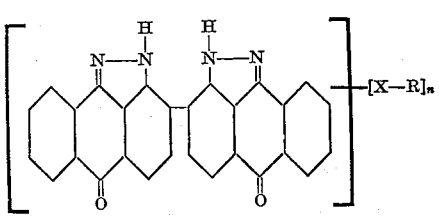

in which X stands for —N.H—, in which case R may be hydrogen or an aromatic radicle, or X stands for —O— or —S—, in which case R is an aromatic radicle, $n$ stands for a number between 1 and 4, and in which all or part of the hydrogen atoms attached to nitrogen atoms may be replaced by alkyl radicles.

2. The dipyrazolanthronyl derivative corresponding to the formula:

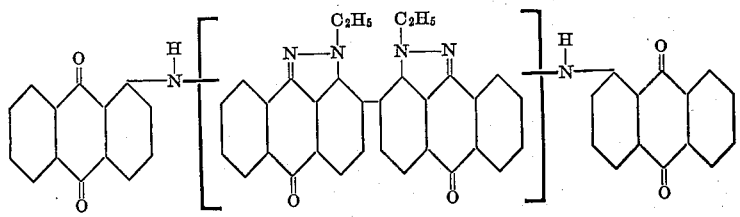

forming a violet powder, dissolving in concentrated sulphuric acid to give a yellow brown solution and dyeing cotton violet shades from a blue green vat.

MAX ALBERT KUNZ.
KARL KOEBERLE.